D. MORRIS.
Plow.

No. 107,705.  Patented Sept. 27, 1870.

Witnesses:
A. W. Almquist
Jno. F. Brooks

Inventor:
D. Morris.
Per
Attorneys

UNITED STATES PATENT OFFICE.

DAVID MORRIS, OF BUNKER HILL, ILLINOIS.

IMPROVEMENT IN PLOWS.

Specification forming part of Letters Patent No. 107,705, dated September 27, 1870.

*To all whom it may concern:*

Be it known that I, DAVID MORRIS, of Bunker Hill, in the county of Macoupin and State of Illinois, have invented a new and useful Improvement in Plows; and I do hereby declare that the following is a full, clear, and exact description thereof, which will enable others skilled in the art to make and use the same, reference being had to the accompanying drawing, forming part of this specification, in which—

Figure 1:
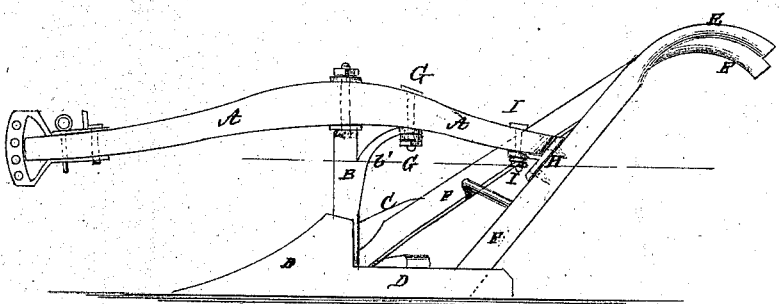
Figure 2:
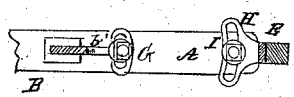

Figure 1 is a side view of my improved plow. Fig. 2 is a detail sectional view of the same, taken through the line $x\,x$, Fig. 1, looking upward.

Similar letters of reference indicate corresponding parts.

My invention relates to that class of plows which has laterally-adjustable beams, by which it may be adapted to a double or treble team; and it consists in an improved supporting-stem having a branch thereto with transverse slot, to strengthen and form a firm support to the beam, thereby preventing it from sagging or getting out of its true relative position.

A represents the beam, B the standard, C the mold-board, D the landside, E the landside-handle, and F the mold-board handle, of the plow.

The upper end of the standard B is rounded off to serve as a pivot, passes up through a hole in the beam A, has two washers placed upon it, one above and the other below the beam A, and is secured in place by a nut screwed upon its upper end, thus pivoting the said beam to the said standard. The standard B is made with a rearwardly-projecting arm or branch, $b'$, the upper end of which rests against the under side of the beam A, and has a transverse slot formed in it, through which and through the beam A passes a bolt, G, provided with washers or nuts.

To the landside-handle E is securely attached a bracket, H, upon which the rear end of the beam A rests, and to which it is secured by a bolt, I, passing through the said beam and through a transverse slot in said bracket. The part of the bracket H upon which the beam A rests may be corrugated or toothed, and the heel of the beam A may have a toothed or corrugated plate attached to it, fitting into the teeth of said bracket. By this construction, by loosening the bolts G and I the plow-beam A may be conveniently adjusted to adapt the plow for use as a two or three horse plow, and when adjusted, by tightening up said bolts G I the said beam will be securely held in place however much strain there may be upon the plow.

Having thus described my invention, I claim as new and desire to secure by Letters Patent—

The arrangement of swiveled beam A, standard B $b'$, bolts G I, slotted bracket H, and handles E F, as and for the purpose described.

DAVID MORRIS.

Witnesses:
F. G. HEDLEY,
E. HARLAN.